United States Patent
Lal et al.

(10) Patent No.: US 6,972,846 B2
(45) Date of Patent: Dec. 6, 2005

(54) MULTI-BEAM HETERODYNE LASER DOPPLER VIBROMETER

(75) Inventors: Amit K. Lal, Ladera Ranch, CA (US); Cecil F. Hess, Irvine, CA (US); Hansheng Zhang, Aliso Viejo, CA (US); L. Ernesto Hurtado, Laguna Niguel, CA (US); Vladimir B. Markov, Irvine, CA (US); Vyacheslav Aranchuk, Oxford, MS (US)

(73) Assignee: MetroLaser, Inc., Irvine, CA (US)

(*) Notice: Subject to any disclaimer, the term of this patent is extended or adjusted under 35 U.S.C. 154(b) by 415 days.

(21) Appl. No.: 10/405,045

(22) Filed: Mar. 31, 2003

(65) Prior Publication Data

US 2005/0237533 A1    Oct. 27, 2005

(51) Int. Cl.[7] ................................................. G01B 9/02
(52) U.S. Cl. ................................................... 356/486
(58) Field of Search ............................ 356/486, 487, 356/488, 492, 493, 494, 498, 499, 502, 521

(56) References Cited

U.S. PATENT DOCUMENTS 5,106,192 A * 4/1992 Tucker et al. ............... 356/477

FOREIGN PATENT DOCUMENTS

GB        2372097 A     8/2002

OTHER PUBLICATIONS

Cupido, E., D. Smith, S. Morel, A Novel Multipoint Laser Doppler Vibrometer, paper from http://www.ometron.com/ometron/default.html, and presented at ISMA 2002.

* cited by examiner

Primary Examiner—Gregory J. Toatley
Assistant Examiner—Michael A. Lyons
(74) Attorney, Agent, or Firm—Eric K. Satermo (57) ABSTRACT

A multi-beam laser Doppler vibrometer simultaneously measures velocity, displacement, and vibration history of multiple locations on an object. A beam of coherent light is split into an object beam and a reference beam. The object beam is divided into a plurality of object beams to simultaneously illuminate multiple locations on the object under inspection. The reference beam is frequency shifted and split into a corresponding plurality of frequency-shifted reference beams. A portion of each object beam is reflected by the object as a modulated object beam. The plurality of modulated object beams are collected and respectively mixed with the plurality of frequency-shifted reference beams to provide a plurality of beam pairs. Each beam pair may be focused onto a photodetector or an optical fiber connected to a photodetector.

70 Claims, 11 Drawing Sheets

MULTI-BEAM HETERODYNE LASER DOPPLER VIBROMETER

STATEMENT REGARDING FEDERALLY SPONSORED RESEARCH

This invention was made with government support under Contract Numbers DAAB07-00-C-F602 and DAAB07-01-C-L853 awarded by the U.S. Department of Defense to MetroLaser, Inc. The government has certain rights in the invention.

BACKGROUND OF THE INVENTION

1. Field of the Invention

The present invention is related to the measurement of vibration using non-invasive, non-contact, and remote techniques; namely, multiple beams of coherent radiation are used as a probe to simultaneously measure vibrations at multiple locations on an object.

2. Description of the Related Art

Laser Doppler vibrometry (LDV) is a well-known non-contact method to measure the vibration of an object. Fields of application include: automotive, aerospace, and civil engineering; landmine detection; non-destructive testing; and non-contact sensing. LDV techniques are based on the use of an interferometer to measure the Doppler frequency shift of light scattered by a moving object. The motion of the object relative to the light source causes a shift of the light's frequency as described by the Doppler equations.

There are two interferometric methods conventionally used for LDV applications: homodyne detection and heterodyne detection. An optical quadrature homodyne interferometer is a simple design utilizing low-frequency photodetectors and amplifiers. However, the non-linear behavior of these components causes harmonic distortions of the measured signal and an overall reduction in accuracy.

The heterodyne detection method using frequency shifting techniques overcomes a number of drawbacks inherent in homodyne detection, including: (a) harmonic doubling that occurs when a source is located a multiple number of wavelengths away from the target; (b) non-linearity that occurs at vibration amplitudes on the order of the measurement radiation's wavelength; (c) a low signal-to-noise ratio caused by sensitivity to laser intensity fluctuations; and (d) inverse frequency (i.e., 1/f) detector noise. Both homodyne and heterodyne LDV systems based on single-point measurement techniques have been extensively investigated and form the basis of various conventional commercial instruments.

Devices consisting of a single-beam LDV system in concert with a beam scanning system have also been developed. Scanned single-beam techniques are suitable for measuring vibrations that are repetitive (e.g., continuously cycling over the same location); however, because the measurements are made sequentially from one location to the next, the value of this technique is limited when the vibrations are transient or non-repetitive. Measurement of non-repetitive vibrations is important when analyzing civil structures, aerospace composite components, and golf clubs, as well as for buried land mine detection. While a plurality of single-beam LDV systems could be used to measure multiple locations on an object, this would be a costly and complicated option if a large number of simultaneous measurements were required.

Simultaneous measurement of multiple locations on an object is needed in order to gain more complete data on an object's vibrational characteristics. Specifically, simultaneous LDV measurements yield: (a) phase information among the measured points, (b) increased inspection speed, and (c) the ability to measure non-repetitive vibration patterns. A simultaneous multi-beam LDV system based on a homodyne interferometer design has also been investigated. However, because that multi-beam technique is based on a homodyne detection method, it is affected by the same performance limitations as the single-beam homodyne system described above.

In view of the foregoing, there is a need in the art for an LDV device that can simultaneously measure multiple locations on an object with the benefits of high signal-to-noise ratio, wide dynamic range, and high accuracy inherent with heterodyne detection.

BRIEF SUMMARY OF THE INVENTION

A heterodyne multiple-beam laser Doppler vibrometer (MBLDV) simultaneously measures displacement or velocity history of a multitude of locations on an object or multiple objects. Simultaneous heterodyne measurement of multiple locations provides a highly accurate measurement of an object's vibrational characteristics, especially transient vibrations. Such precise measurement of non-repetitive vibrations enhances the capability of laser Doppler velocimetry.

According to one aspect of the invention, a multi-beam heterodyne vibrometer includes an optical system and a combining element. The optical system generates a plurality of object beams and a plurality of frequency-shifted reference beams. The plurality of frequency-shifted reference beams have a frequency that is shifted from a frequency of the plurality of object beams. The object beams are then transmitted to an object. A portion of each of the object beams is scattered and reflected off of the object as a modulated object beam. The modulated object beams are then collected by the optical system. The combining element combines each of the modulated object beams with a respective one of the frequency-shifted reference beams into a plurality of beam pairs. The beam pairs may then be processed to determine characteristics of the object.

One of the advantages of the invention is that the vibrometer is able to simultaneous measure velocity or displacement of an object over multiple points. The heterodyne technique utilized by the vibrometer enables measurements near zero frequency with excellent fidelity. Measurements made by the vibrometer of the invention are characterized by high signal-to-noise ratio, wide dynamic range, and simple alignment. The system may utilize a computer with software for computing and displaying the velocity and/or amplitude history of all of the measured points of the object.

Other features and advantages of the present invention will become apparent to those skilled in the art from a consideration of the following detailed description taken in conjunction with the accompanying drawings.

DETAILED DESCRIPTION OF THE INVENTION

A multiple-beam laser Doppler vibrometer (MBLDV) of the invention simultaneously measures the vibrational characteristics at multiple locations on a target object. The MBLDV may be utilized in a number of different applications. For example, in a number of embodiments the MBLDV may be used in concert with acoustic techniques to measure transient vibrations in a land mine detection system. In other embodiments the MBLDV may be used to find internal flaws in structural components (e.g., composite materials, honeycomb, etc.). The MBLDV may also be used with or without additional acoustic excitation to measure vibration on automotive components, vibration on aircraft components, vibration on musical instruments, vibration on office machines (e.g., copiers and computers). In other embodiments the MBLDV may be used to measure vibration from bridges and civil engineering structures.

Figure 1:
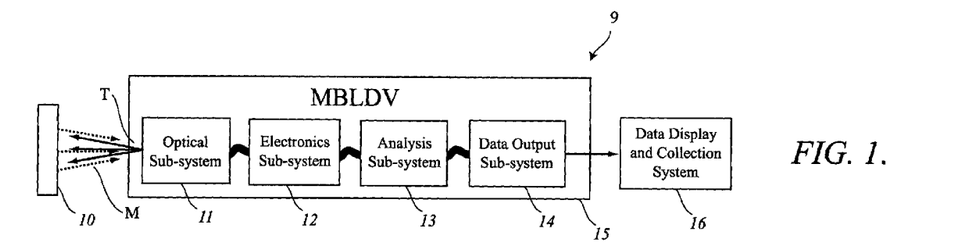
FIG. 1 is a block diagram of a multi-beam laser Doppler vibrometer (MBLDV) system of the invention.

Referring to the drawings in more detail, a block diagram of an exemplary embodiment of a MBLDV system 9 is illustrated in FIG. 1. Multiple beams T (shown in solid line) are transmitted to and illuminate an object 10 under inspection, and back-scattered radiation M (shown in dashed line) from the beams T is collected by an optical subsystem 11. In a number of embodiments, the optical system processes the back-scattered radiation M and provides data associated with the radiation M to an electronics subsystem 12.

Depending upon the application, the electronics subsystem 12 may further process the data prior to providing the data to an analysis subsystem 13. After analysis, the data may be provided to a data output subsystem 14. In some of the embodiments, subsystems 11, 12, 13, and 14 may be incorporated as a single-unit MBLDV 15. The data output subsystem 14 of the MBLDV 15 may provide processed data to a data collection and display system 16 of the system 9.

Figure 2:
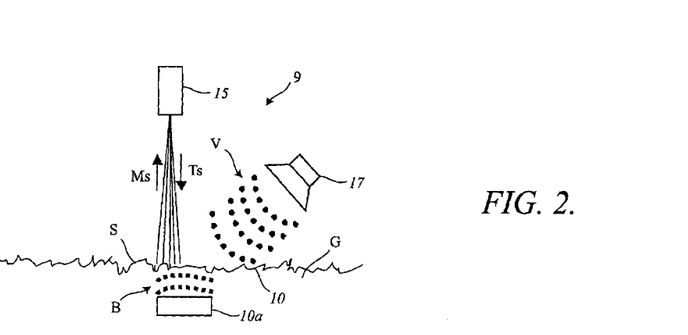
FIG. 2 is a schematic view of a MBLDV implemented in an object-detection embodiment.

According to a number of embodiments, the MBLDV system 9 may be configured as a buried land mine detection system, which is depicted in FIG. 2. In these embodiments, the system 9 may include the MBLDV 15 and an audio source 17 such as a speaker. Acoustic vibrations V from the audio source 17 send vibrations into the ground G. When coupled to a buried object 10a, vibrations B modulate the surface S of the soil. The transient vibrations of the soil may then be measured by the MBLDV 15 to detect the object 10a. In this embodiment, the transmitted object beams Ts are scattered and reflected by the soil S, not the object 10a necessarily.

The system 9 illustrated in FIG. 2 may also be utilized in a nondestructive testing embodiment. In these embodiments, the object 10a may be a subsurface flaw, which flaw is detected by the MBLDV 15 after excitation from an acoustic source 17. In other embodiments, the MBLDV 15 may analyze self-excitation objects such as loud speakers and engines.

Figure 3:
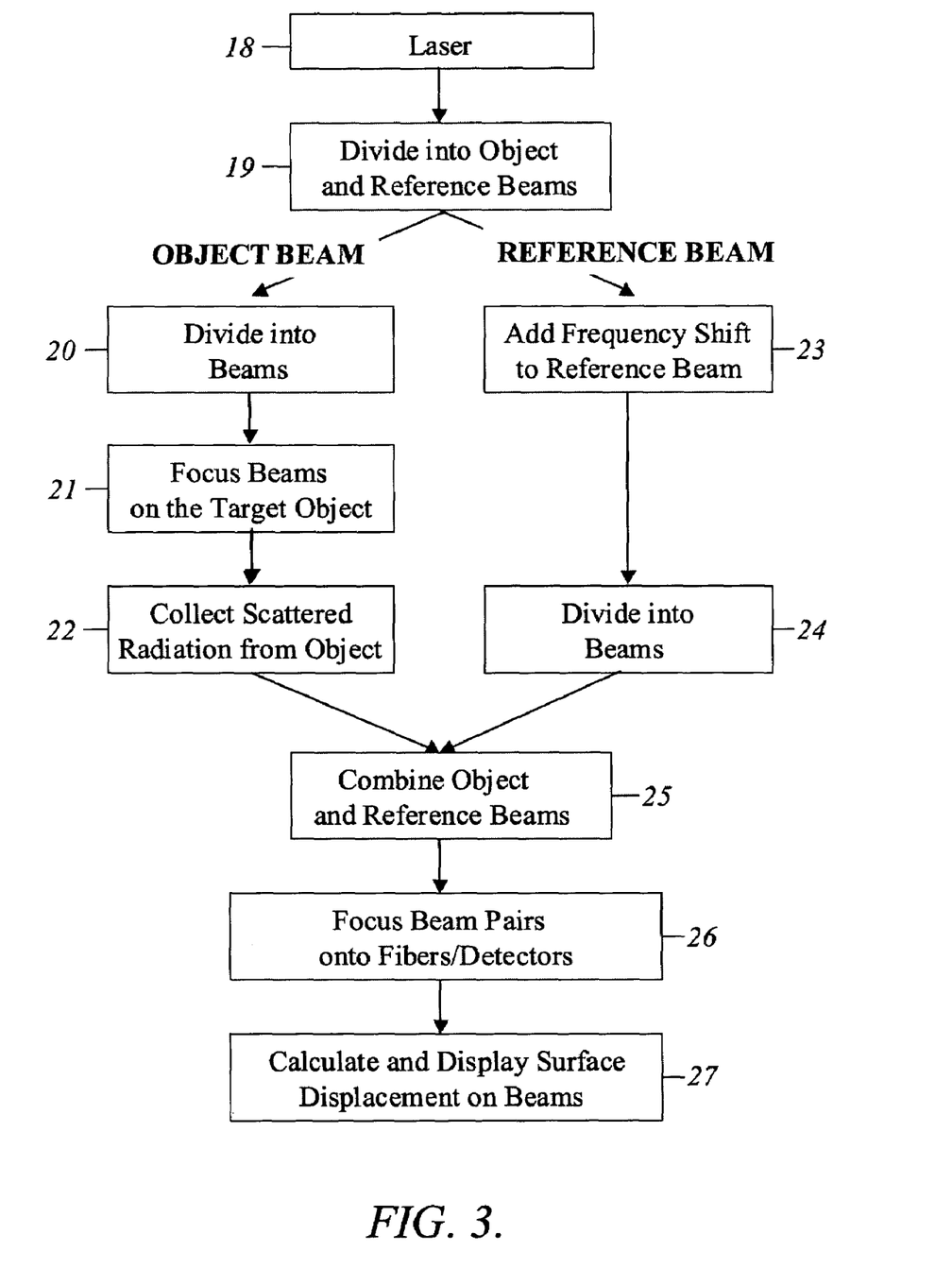
FIG. 3 is a flow chart illustrating methodology according to a number of embodiments of the invention.

Referring to FIG. 3, in a number of embodiments the MBLDV system 9 operationally may provide a coherent laser source 18 which is divided into an object beam and a reference beam at process 19. At process 20 the object beam may be divided into a plurality of object beams, which, at process 21, may then be focused onto a targeted object 10. Vibrations at multiple locations on the object 10 modulate the multiple object beams simultaneously. The modulated object beam radiation is scattered and reflected back by the object 10, which is also know as backscattering. At process 22, this reflected and scattered radiation from the object 10 may be collected by the optical subsystem 11 of the MBLDV 15.

Regarding the reference beam, at process 23 a frequency shift may be added to the reference beam. In a number of embodiments, the frequency-shifted reference beam may be referred to as a local oscillator. At process 24 the frequency-shifted reference beam may be divided into a plurality of reference beams. At process 25 the modulated reflected and scattered radiation from the object and the plurality of frequency-shifted reference beams may be combined and, at process 26, focused into a plurality of fiber optics or detectors.

At process 27 data collected by the detectors may be analyzed. For example, surface displacement of each of the object beams may be calculated using a computer, displayed on a monitor, or output to a peripheral device of the display and collection system 16.

In alternative embodiments, rather than utilizing a frequency-shifted reference beam, the MBLDV 15 may be configured to frequency shift the object beam. The resulting frequency-shifted object beam may be split into a plurality of frequency-shifted object beams that are transmitted to the object. In this regard, the optical beam path in FIG. 3 may include process 23 in which a frequency shift is added to the object beam prior to process 20 in which the beam is divided.

Figure 4:
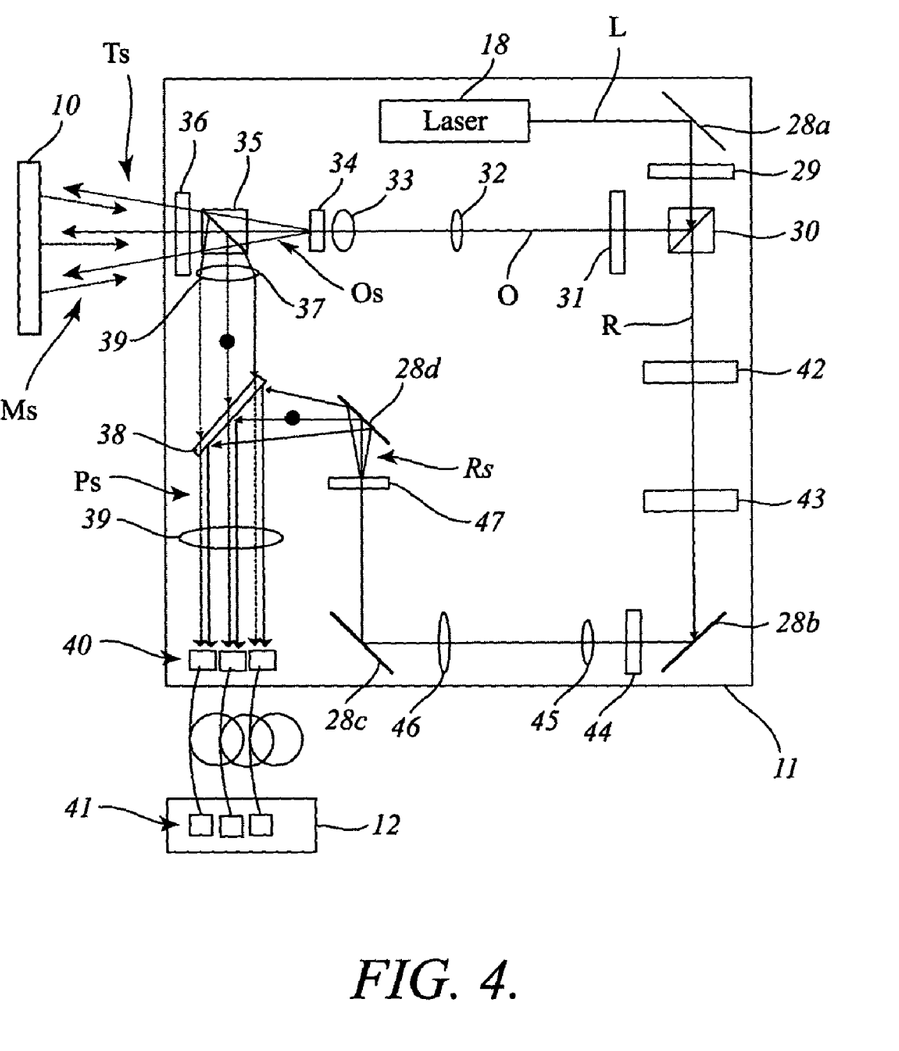
FIG. 4 is a schematic view of a MBLDV according to some of the embodiments.

With reference to FIG. 4, according to a number of embodiments, the optical sub-system 11 may include a laser 18 as a radiation source. For example, the laser 18 may be a single continuous-wave frequency-stabilized diode-pumped Nd:YAG laser that produces an ultra-narrow linewidth 532 nm beam with a single axial mode.

The output beam L of the laser 18 is reflected by a mirror 28a. A first half-waveplate (HWP) 29 may be positioned downstream of the mirror 28a to rotate the polarization of the beam and thus provide variable control of the irradiance of beams downstream thereof. The output beam L may then be split into an object beam O and a reference beam R at a first polarizing beam splitter (PBS) 30. As shown in the example in FIG. 4, the S-polarized portion of the output beam L is reflected by the PBS 30 and used as the object beam O, and the P-polarized portion of the output beam L is transmitted by the PBS 30 and used as the reference beam R. (For purposes of this description, the conventional scientific notation for polarization is used in the drawings, i.e., an arrow for P-polarization and a dot for S-polarization.)

Regarding a path of the object beam O (i.e., the object path), a second HWP 31 may be positioned downstream of the PBS 30 to rotate the object beam O to P-polarization. A telescope formed by a first lens 32 and a second lens 33 may be utilized to expand the object beam O from where the object beam O is incident at a first (or object) diffractive optical element (DOE) 34, which splits the object beam O into a plurality of object beams Os. The lenses 32 and 33 may also focus the object beams Os onto the targeted object 10. The plurality of object beams Os may then be transmitted through a second PBS 35 and a quarter-waveplate (QWP) 36 and then transmitted to the object 10 under inspection, which transmitted object beams are indicated by Ts. The plurality of transmitted object beams Ts irradiate substantially simultaneously a corresponding plurality of points on the object 10.

In alternative embodiments, a plurality of lasers, beam splitters, and other optical element may be used to split an object beam into a plurality of object beams. Furthermore, the pattern of the object beams may follow different geometries depending on the choice of beam splitter. For example, in the embodiment shown in FIG. 4, the object beam O is linearly split into a plurality of object beams Os. In other embodiments, the object beam O may be split into a plurality of object beams that form a matrix of X columns and Y rows. In still other embodiments, the optical subsystem 11 may include arbitrary multiple beam patterns and scanning of the beams.

Vibrations of the object 10 frequency modulate each of the transmitted object beams T substantially simultaneously. A portion of these modulated object beams, which are indicated by Ms, is scattered and reflected back to the optical subsystem 11. In the embodiment shown in FIG. 4., the modulated object beams Ms may pass through the QWP 36 and rotate to S-polarization. The modulated object beams Ms may then be reflected at the PBS 35 and collected by a lens 37. Downstream of lens 37 may be positioned a beam combiner 38, a lens 39, an optical output 40, and a sensing element 41, which will be discussed in more detail below.

Turning to a path of the reference beam R (i.e., the reference path), in the embodiment shown in FIG. 4 the reference beam R may be initially frequency shifted. To do so, in a number of embodiments the reference beam R may travel sequentially through one or more acousto-optic modulators. In the embodiment shown, two acousto-optic modulators (AOM) 42 and 43 are employed. In some of the embodiments, the AOMs 42 and 43 may be operated at different frequencies, for example, frequency $f_1$ and frequency $f_2$, respectively, so that different diffraction orders of the reference beam R may be selected. For example, the first AOM 42 operating at frequency f, may select the $+1^{st}$ order diffracted beam of the reference beam R, and the second AOM 43 operating at frequency $f_2$ may select the $-1^{st}$ order diffracted beam of the reference beam R. In this example, the reference beam R is frequency shifted by the difference of frequencies $f_1$ and $f_2$. As an example, AOM 42 operating at a frequency of 80 MHz and AOM 43 operating at a frequency of 80.1 MHz produce a frequency shift of 100 kHz on the reference beam R.

In other embodiments of the invention, the object beam O can be frequency shifted to achieve a carrier frequency that yields a typical heterodyne signal in detectors of a detector array. As in the case of the reference beam, this frequency shift may be obtained with a single AOM, two AOMs, or various other devices such as rotating gratings, microelectromechanical system (MEMS), liquid crystal gratings, and other devices to shift the frequency of the beams.

Upon being frequency shifted, the reference beam R may be reflected by a mirror 28b through a third HWP 44 to rotate the reference beam R to S-polarization so that the reference beam R has the same polarization as the collected modulated object beams Ms after they pass through the quarter waveplate 36 and beamplitter 35. The reference beam R may then be expanded and collimated by a telescope formed by a first lens 45 and a second lens 46.

The collimated reference beam R may then be reflected from a mirror 28c through a second (or reference) DOE 47. In a number of embodiments, the reference DOE 47 may be identical to the object DOE 34. The reference DOE 47 splits the reference beam R into a plurality of reference beams. In embodiments in which the DOEs 34 and 47 are substantially the same, the number of object beams is equal to the number of reference beams (e.g., 16); in addition, the angle at which the object beams diverge from the object DOE 34 is substantially equal to the angle at which the reference beams diverge from the reference DOE 47. For example, the DOEs 34 and 47 may split the beams O and R into 16 beams Os and Rs, respectively, which beams diverge from the DOEs at an angle of about 22 degrees. Those skilled in the art will appreciate that the DOEs 34 and 47 may be modified to produce any number of beams that diverge at any angle.

Upon splitting, the reference beams Rs may be reflected from a mirror 28d toward the beam combiner 38. In accordance with a number of embodiments, the beam combiner 38 combines each of the plurality of reference beams Rs with a respective one of the modulated object beams Ms, thereby yielding a corresponding plurality of beam pairs Ps, wherein each beam pair P includes a modulated object beam M and a frequency-shifted reference beam R. In some of the embodiments, the beam combiner 38 aligns each of the reference beams Rs to overlap with one of the modulated object beams Ms.

The plurality of beam pairs Ps may then be focused on an optical output, such as a plurality of optical fibers 40, which may be coupled to a detecting element, such as a plurality of photodetectors 41 located in the electronics subsystem 12. Lenses 37 and 39 focus or image the modulated object beams Ms onto the optical fibers 40. In other embodiments the plurality of photodetectors may replace the optical output so that the beam pairs Ps focus directly on the photodetectors. In other embodiments the detecting element may include coherent fiber bundles, photodiodes, CMOS detector arrays, or CCD detector arrays.

Each of the detectors 41 senses a frequency-modulated signal of a beam pair P. The frequency-modulated signal of each beam pair P has a carrier frequency $f_c$ given by the difference of the frequencies of the AOMs 42 and 43, namely, $f_c=f_1-f_2$. In addition, frequency-modulated signal of each beam pair P has a frequency deviation caused by vibration of the object 10.

In a number of embodiments, in addition to providing an interface for the signals output by the optical subsystem 11, the electronics subsystem 12 may provide power to and filtering functions for the detectors 41. Further, the electronics subsystem 12 may be coupled to the AOM 42 and 43 to provide power and drive signals to the AOMs for frequency shifting the reference beam R.

As mentioned, each optical fiber 40 of the optical subsystem 11 may be coupled to a photodetector 41 of the electronic subsystem 12. Each of the detectors 41 has a bandwidth that may be chosen to be larger than the carrier frequency $f_c$ of the beam pairs Ps. For example, if frequency $f_1$ of AOM 42 is 80.0 MHz and frequency $f_2$ of AOM 43 is 80.1 MHz, then the bandwidth of the detectors 41 may be larger than 100 kHz (i.e., $f_1-f_2$), for example, about 1 MHz.

Figure 5:
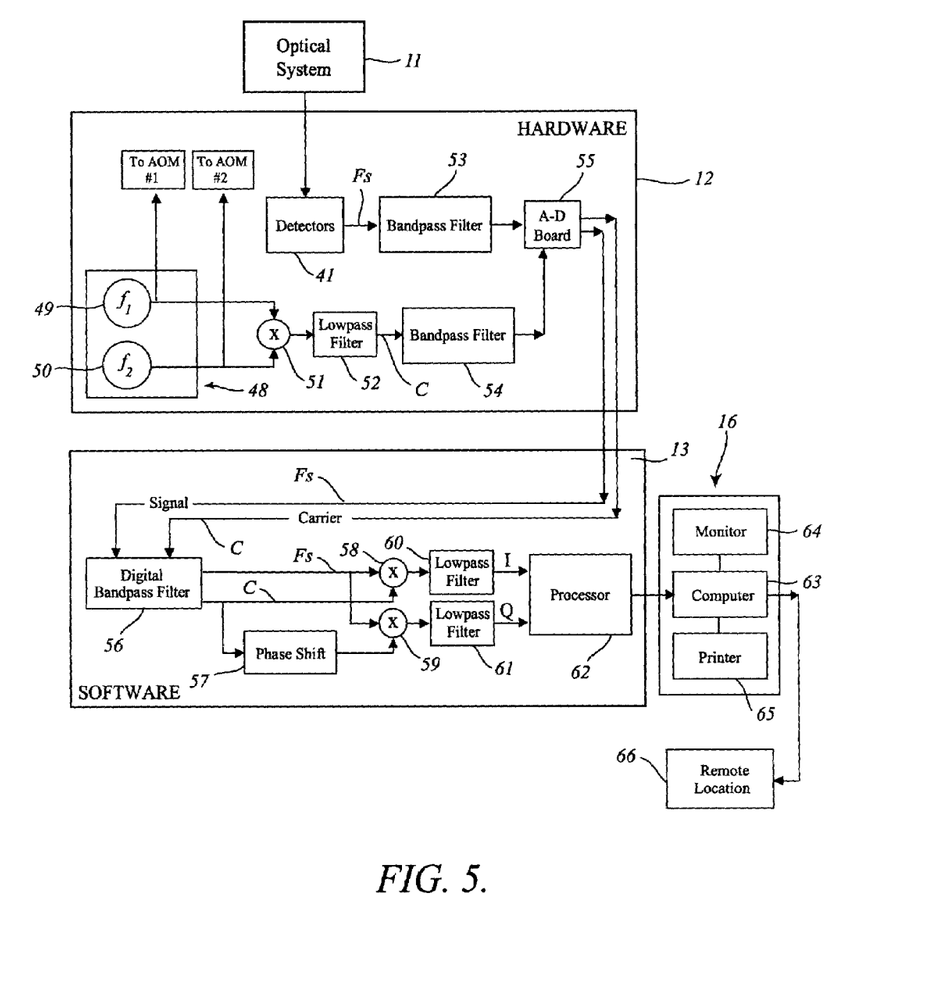
FIG. 5 is a schematic view of an embodiment of an analyzing portion of the MBLDV system.

Referring to FIG. 5, in a number of embodiments, the electronics subsystem 12 may include a reference clock 48 for generating the carrier frequency $f_c$. In some of the embodiments, the clock 48 may include a pair of radio frequency (RF) drivers 49 and 50 respectively operating at frequency $f_1$ and frequency $f_2$, which frequencies may be provided to the AOMs 42 and 43, respectively. An electronic mixer 51 may mix frequencies $f_1$ and $f_2$ to generate a frequency equal to the sum ($f_1+f_2$) and a frequency equal to the difference ($f_1-f_2$). A low-pass filter 52 may be positioned downstream of the mixer 51 to eliminate the sum frequency, thereby providing a carrier signal C at the frequency $f_c$.

The electronics subsystem 12 may also include a pair of bandpass filters 53 and 54 each of which is centered at the carrier frequency $f_c$ (i.e., $f_1-f_2$). The filters 53 and 54 maintain a high signal-to-noise ratio in frequency-modulated signals Fs output from the detectors 41 and the carrier signal C output from the reference clock 48. In those embodiments in which a plurality of optical fibers 40 respectively receive the plurality of beam pairs Ps (see FIG. 4), each of the frequency-modulated signals Fs corresponds to a respective one of the beam pairs Ps and, accordingly, to a respective one of the modulate object beams Ms.

The carrier signal C from the reference clock 48 and the frequency-modulated signals Fs from the detectors 41 may then be digitized by a simultaneous sampling analog-to-digital (A-D) data-acquisition system 55. In a number of embodiments, the sampling rate of the A-D system 55 may be sufficiently large when compared to the carrier frequency $f_c$; for example, if the carrier frequency $f_c$ is about 100 kHz, then the sampling rate may be at least about 300 kHz.

When digitized, the frequency-modulate signals Fs and the carrier signal C may be provided to the analysis subsystem 13. In a number of embodiments, the analysis subsystem 13 utilizes software to analyze the signals Fs from the detectors 41. In a number of embodiments, the frequency-modulated signals Fs and the carrier signal C may be initially cleaned with one or more digital bandpass filters 56. The carrier signal C may then be phase-shifted 57, for example, by 90 degrees, with a software algorithm, such as a digital Hilbert transform.

The carrier signal C and the phase-shifted carrier signal may then be mixed with each of the frequency-modulated signals Fs, which is indicated at 58 and 59, respectively. Each of the mixed signals may then be low-pass filtered 60 and 61. The result of this digital processing are a set of in-phase signals I and a set of quadrature signals Q signals for each of the frequency-modulated signals Fs.

The in-phase and quadrature signals I and Q may then be processed by a processor 62 to determine a number of attributes of the object 10. For example, in a number of embodiments object displacement may be calculated utilizing the inverse tangent of the in-phase and quadrature signals I and Q. In addition, discontinuities at steps of $2\pi$ may be removed from signals I and Q by standard phase unwrapping techniques. Alternatively, object velocity may be calculated from the quantity:

$$[(I'\times Q)-(I\times Q')]\div[I^2+Q^2].$$

In a number of embodiments, when the displacement (or the velocity) of the object 10 has been calculated as a function of time for each of the frequency-modulated signals Fs, then signals I and Q may be Fourier analyzed to determine the displacement (or the velocity) as a function of frequency. The resulting Fourier spectra may then sent by a computer 63 of the display subsystem 16 to an output device, such as a monitor 64. Alternatively, the computer 63 may provide a hardcopy of the analyzed data to a printer 65 or transmit the data to a remote location 66, for example, over a network. A software package may be implemented on the computer 63 for processing data associated with the frequency-modulated signals Fs.

In a number of embodiments, the Fourier spectra may be displayed in a "waterfall"-type graph with a small offset applied to each spectrum so that all of the spectra can be viewed simultaneously. In addition, a one-dimensional or a two-dimensional surface map of the displacement (or the velocity) of the object 10 may be created at a given frequency band. To improve the processing speed of the analysis subsystem 13, displacement-versus-time signals can be safely down-sampled from the high sampling frequency (e.g., at least about 300 kHz) down to a low sampling frequency (e.g., less than 10 kHz), thereby resulting in faster Fourier transform calculations. Overall, each of the heterodyne signals Fs corresponding to each of the modulated object beams Ms may be simultaneously analyzed with one or more demodulation techniques.

Figure 6:
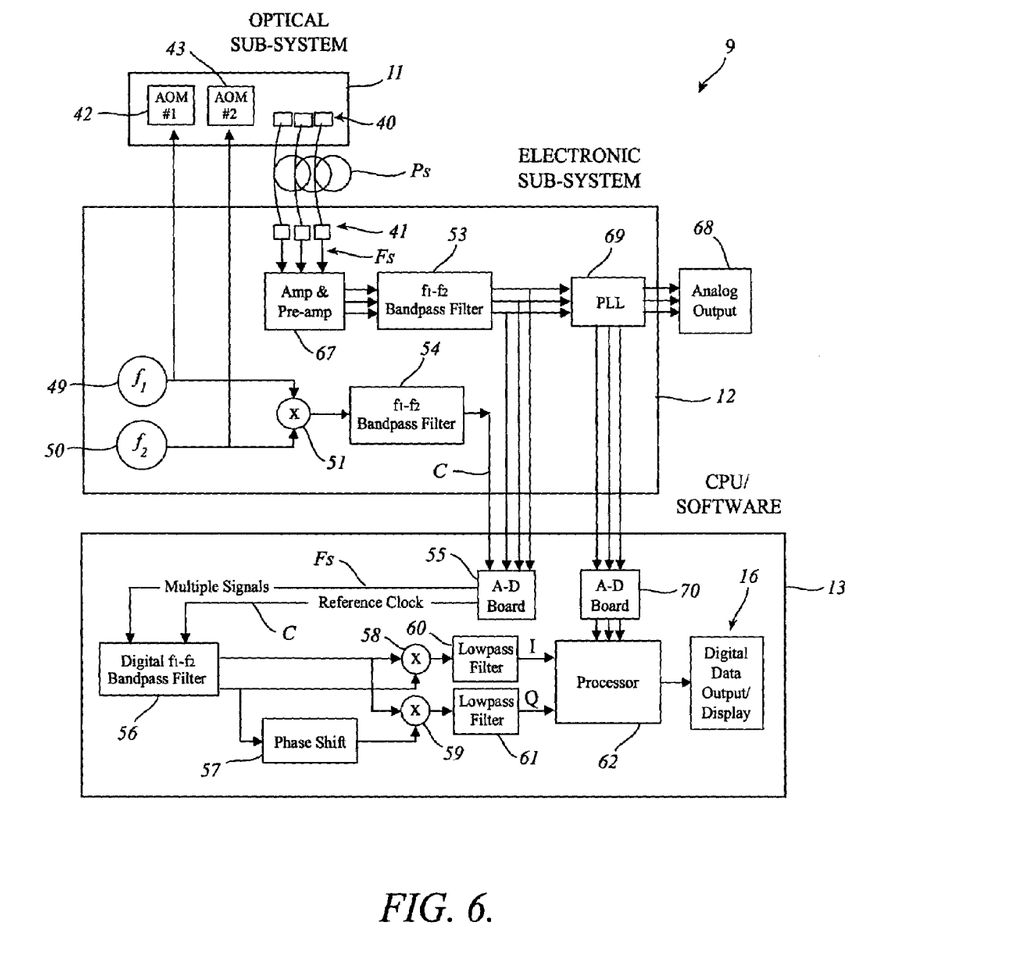
FIG. 6 is a schematic view of another embodiment of the analyzing portion.

Alternative embodiments of the electronics subsystem 12 and the analysis subsystem 13 are illustrated in FIG. 6. To maintain a high signal-to-noise ratio, the electronics subsystem 12 may include a pre-amplifier stage and an amplifier stage 67 to amplify the frequency-modulated signals Fs output from the detectors 41. In embodiments both analog and digital processing is desired, the frequency-modulated signals Fs may be provided to an analog output 68 through phase-locked loop (PLL) circuitry 69. Further, in addition to digitizing the frequency-modulated signals Fs and the carrier signal C with the A-D converter 55 for downstream conditioning by elements 56 to 61, the frequency-modulated signals Fs may be digitized by a second A-D converter 70, the output of which is fed directly to the processor 62.

With further reference to FIG. 2, according to a number of embodiments the vibrometer 15 may be configured to detect land mines. As mentioned above, a loudspeaker 17 may be utilized to generate acoustic waves V in the air, which couple into the ground G and cause the buried object 10 (i.e., a land mine) to vibrate. The vibrations of the object 10 (indicated by B) cause the soil S above the object 10 to vibrate. The MBLDV 15 may then be utilized to collect the modulated object beams Ms and analyze the resulting frequency-modulated signals Fs. For example, the velocity of the soil S at multiple points may be calculated. The presence of a buried object 10 can be determined by studying the spatial distribution of the soil velocity spectra.

Because of the plurality of transmitted object beams Ts, the MBLDV 15 is able to simultaneously measure a plurality of points, thereby substantially reducing the time required take the measurements necessary to detect a buried object 10. For example, if there are 16 transmitted object beams Ts, then the MBLDV 15 would reduce the necessary measurement time by a factor of 16 over conventional single-beam scanning systems. A one-dimensional beam array may then be translated in the cross-dimension, thereby providing coverage of a two-dimensional area in a much shorter time than a conventional scanning method.

According to a number of embodiments, the MBLDV 15 may be configured to detect both surface defects (e.g., cracks) and subsurface defects (e.g., disbonds, delaminations, etc.) in aircraft and ship panels. In these embodiments, the surface of a panel may be excited by an acoustic or mechanical source. The resulting surface displacement (or velocity) profile may then be examined with by the MBLDV system 9. The presence of a surface defect, such as a crack, causes a change in the vibrational pattern of the surface. The presence of a subsurface defect may cause an enhanced velocity above the defect at a particular resonance frequency. In contrast to conventional scanning devices where the surface must be excited repetitively, the MBLDV 15 of the invention is able to analyze a plurality of points simultaneously with a single excitation of the surface. In addition, the MBLDV 15 is able to provide the relative phase between each analyzed point so that modal vibrational patterns can be immediately observed.

In addition to detecting defects as described above, the MBLDV 15 has many other applications. For example, the vibration pattern of a test object may be measured, such as speakers, musical instruments, automotive disc brakes, computer disks, car panels, airplane panels, and so on. In these embodiments, the MBLDV 15 measures the vibration of the object without any additional acoustic excitation.

Figure 7:
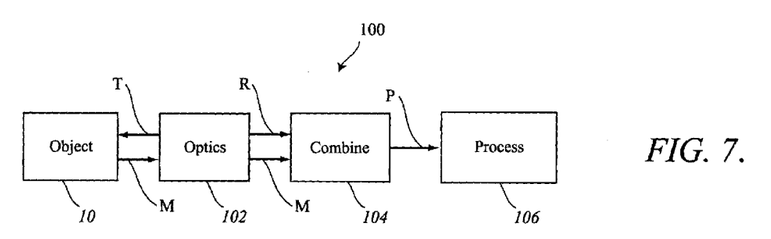
FIG. 7 is a block diagram that schematically illustrate general principles of the invention.

Turning to a more general description of the principles of the invention with reference to FIG. 7, a multi-beam heterodyne vibrometer 100 for analyzing vibration of an object 10 includes an optical system 102 and a combining element 104. In a number of embodiments, the optical system 102 generates a plurality of object beams T that are transmitted to the object 10 and a plurality of frequency-shifted reference beams R. The plurality of frequency-shifted reference beams R having a frequency that is shifted from a frequency of the plurality of transmitted object beams T. A portion of each of the transmitted object beams T is reflected off of the object 10, thereby producing a plurality of modulated object beam M. The optical system 102 also collects the modulated object beams M reflected by the object 10. The combining element 104 combines each of the modulated object beams M with a respective one of the frequency-shifted reference beams R into a plurality of beam pairs P, which may be provided to a process stage 106.

Figure 8A:
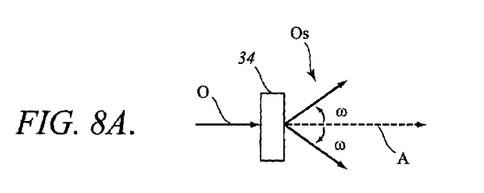
FIGS. 8A and 8B schematically illustrate beam-splitting principles of the invention according to a number of embodiments.
Figure 8B:
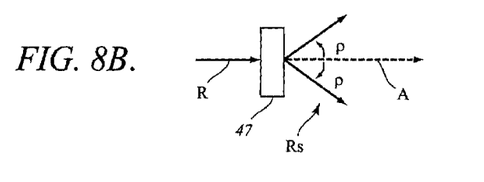
Figure 9A:
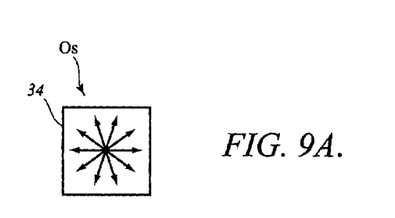
FIGS. 9A and 9B schematically illustrate beam-splitting principles of the invention according to other embodiments.
Figure 9B:
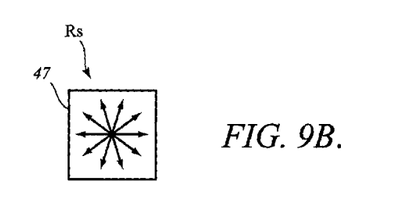

Referencing FIGS. 8A and 8B, the optical system 102 includes a pair of beam splitters, such as the DOEs 34 and 47 (see FIG. 4), for respectively splitting the object beam O into the plurality of object beams Os and the frequency shifted reference beam R into the plurality of frequency-shifted reference beams Rs. DOE 34 is configured to split the object beam O so that the plurality of object beams Os diverge from an optical axis A of the DOE 34 at a divergence angle ω. Similarly, DOE 47 is configured to split the frequency-shifted reference beam R so that the plurality of frequency-shifted reference beams Rs diverge from the optical axis A of DOE 47 at a divergence angle ρ. The divergence of the object beams Os and the frequency-shifted reference beams Rs is also shown in FIGS. 9A and 9B. According to a number of embodiments, the DOEs 34 and 47 are configured so that divergence angle co of the object beams Os is substantially the same as the divergence angle ρ of the frequency-shifted reference beams Rs.

With continued reference to FIGS. 9A and 9B, in other embodiments the DOEs 34 and 47 may be configured to split the object beam O and the frequency-shifted reference beam R, respectively, so that the number of object beams Os is equal to the number of frequency-shifted reference beams Rs. For example, the number of beams may be an exponential of 2, i.e., $2^n$ where n is an integer.

Figure 10A:
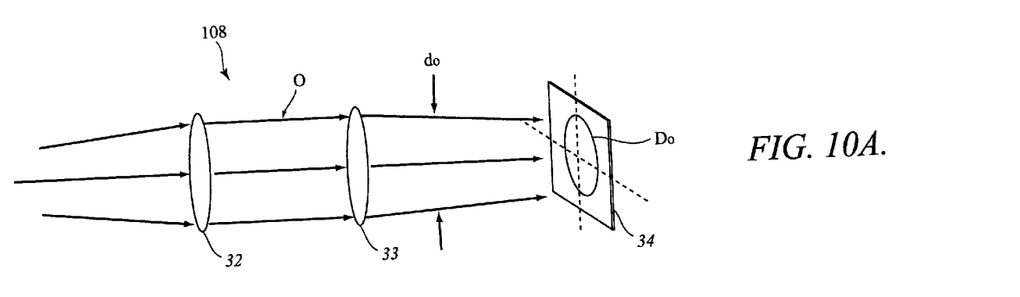
FIGS. 10A and 10B schematically illustrate principles for directing a beam onto a beam splitter according to still other embodiments.
Figure 10B:
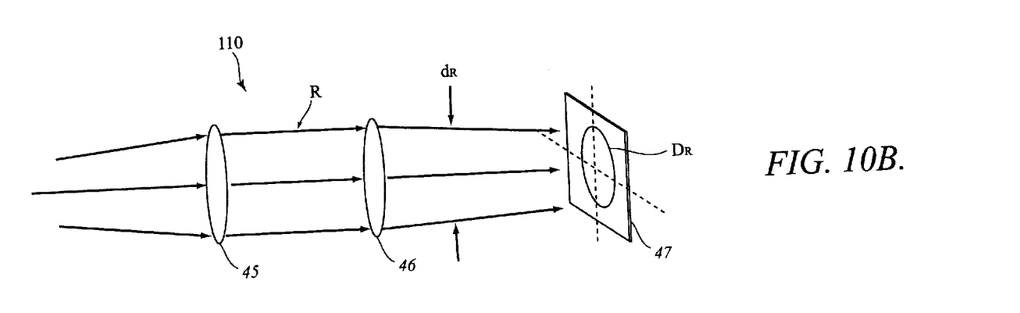

With additional reference to FIGS. 10A and 10B, the optical system 102 may also include a first telescope 108 for focusing or directing the object beam O onto one of the beam splitters, i.e., HOE 34, and a second telescope 110 for focusing or directing the frequency-shifted reference beam R onto the other one of the beam splitters, i.e., DOE 47. As shown in the drawings, in a number of embodiments, the first telescope 108 may include lenses 32 and 33 and the second telescope 110 may include lenses 45 and 46 of the embodiment illustrated in FIG. 4. As mentioned above, the first telescope 108 also focuses the plurality of object beams Os onto the object 10.

As shown in FIGS. 10A and 10B, the object beam O has a diameter $d_O$, and the frequency-shifted reference beam R has a diameter $d_R$. According to a number of embodiments, the telescopes 108 and 110 are configured to direct or closely collimate the object beam O and the frequency-shifted reference beam R, respectively, onto a respective one of the beam splitters, i.e., DOEs 34 and 47, respectively, such that the diameters of the beams O and R are substantially equal when incident upon the DOEs 34 and 47. The diameters of the object beam O and the frequency-shifted reference beam R when incident with the DOEs 34 and 47 are indicated by $D_O$ and $D_R$, respectively. For example, the first telescope 108 may slightly focus the object beam O onto DOE 34 so that a beam diameter $D_O$ is produced at DOE 34, while sharply focusing the transmitted object beams Os at the target 10. The second telescope 110 may collimate the frequency-shifted reference beam R onto DOE 47 so that diameters $D_O$ and $D_R$ are substantially the same.

Figure 11:
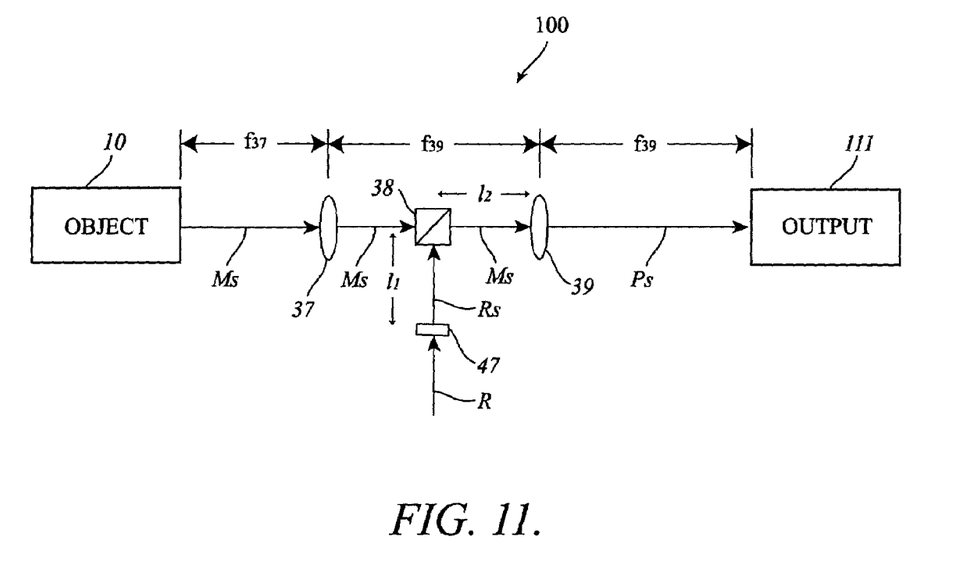
FIG. 11 is a schematic view of an embodiment of a collecting and combining portion of the invention.

With reference to FIG. 11, the optical system 100 may include a collecting lens 37 for collecting the modulated object beams Ms. The collecting lens 37 has a focal length $f_{37}$. According to a number of embodiments, the optical system 100 is positioned from the object 10 by a distance substantially equal to the focal length $f_{37}$ of the collecting lens 37. Accordingly, the modulated object beams Ms are individually collimated by the collecting lens 37 while maintaining the divergence angle ω as the beams Ms travel through the center of the lens 37.

The optical system 100 may also include a focusing lens 39 positioned downstream from the combining element 38 and having a focal length $f_{39}$. In a number of embodiments, the focusing lens 39 is positioned from the collecting lens 37 by a distance substantially equal to focal length $f_{39}$. In other embodiments, an output element 111, such as a detector element, may be positioned downstream from the focusing lens 39 by a distance substantially equal to focal length $f_{39}$.

In still other embodiments, the DOE 47 for splitting the frequency-shifted reference beam R is positioned upstream from the focusing lens 39 by a distance substantially equal to focal length $f_{39}$. For example, as shown in FIG. 11, the sum of a distance $l_1$ from DOE 47 to the combining element 38 and a distance $l_2$ from the combining element 38 to the focusing lens 39 is substantially equal to focal length $f_{39}$.

Figure 12:
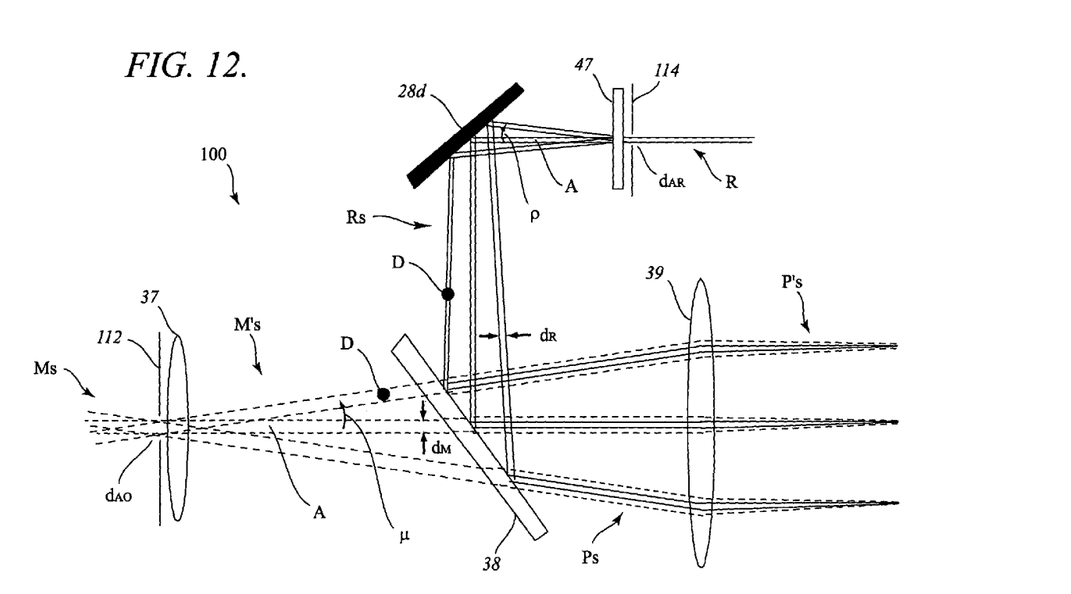
FIG. 12 is a schematic view of another embodiment of the collecting and combining portion of the invention.

Referring to FIG. 12, the optical system 100 may also includes an aperture 112 positioned adjacent to the collecting lens 37. The aperture 112 has a diameter $d_{AO}$. In addition, the frequency-shifted reference beams Rs each have a diameter $d_R$. According to a number of embodiments, the diameter $d_{AO}$ of the aperture 112 is substantially equal to the diameter $d_R$ of the frequency-shifted reference beams Rs. As a result, a diameter $d_M$ of the modulated object beams Ms is substantially equal to the diameter $d_R$ of the frequency-shifted reference beams Rs.

In other embodiments, the optical system 100 may include a second aperture 114 positioned at an upstream side of DOE 47. The reference-path aperture 114 has a diameter $d_{AR}$. In a number of embodiments, the diameter $d_{AR}$ of the reference-path aperture 114 is substantially equal to the diameter $d_{AO}$ of the object-path aperture 112.

As mentioned above, in a number of embodiments the polarization of the modulated object beams Ms and the polarization of the frequency-shifted reference beams Rs are the same. As shown in FIG. 12, the polarizations are indicated as S-polarization with the dots D.

In addition to collecting the modulated object beams Ms, the collecting lens 37 may also collimate the modulated object beams Ms. The collimated modulated object beams are indicated by Ms' in FIG. 12. Similarly, the plurality of frequency-shifted reference beams Rs may be collimated by the telescope 110 lens prior to being combined into the beam pairs Ps.

Furthermore, the modulated object beams Ms' diverge from an optical axis A of the collecting lens 37 at an angle $\mu$. According to a number of embodiments, the divergence angle 1 of the modulated object beams Ms' is substantially equal to the divergence angle $\rho$ of the frequency-shifted reference beams Rs from DOE 47. Also as shown in FIG. 12, the focusing lens 39 may render the plurality of beam pairs Ps substantially parallel with each other, which parallel beam pairs are indicated by Ps'.

Figure 13:
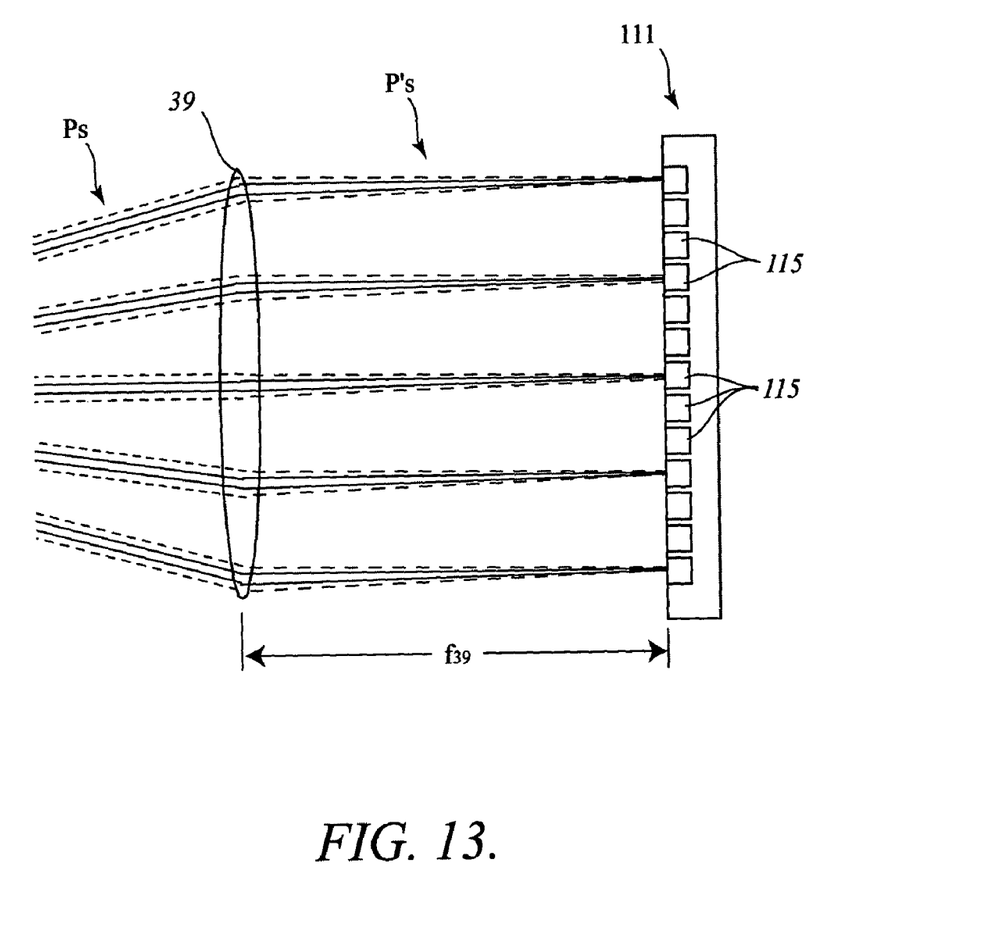
FIG. 13 illustrates an optical relationship between a focusing lens and an output element of the invention.

With additional reference to FIG. 13, the focusing lens 39 may be positioned a focal length $f_{39}$ away the output element 111 so that lens 39 focuses each of the parallel beam pairs Ps' onto the element. As mentioned above, the output element 111 may be an array including a plurality of elements 115, such as photodetectors or optical fibers. Accordingly, the focusing lens 39 focuses each of the beam pairs Ps' onto a respect one of the elements 115. In embodiments where the elements 115 are optical fibers, a plurality of photodetectors may be provided downstream from the optical fibers. In either embodiment, the output element 111 converts the optical signals of the plurality of beam pairs Ps into the frequency-modulated signals Fs (either analog or digital signals) mentioned above.

Figure 14:
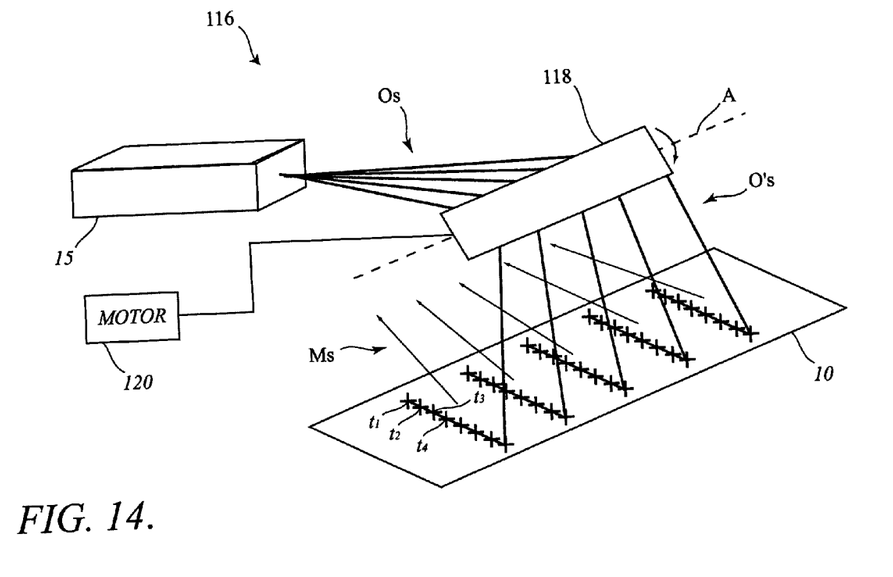
FIG. 14 is a schematic view of a MBLDV implemented in a scanning embodiment.

The MBLDV 15 of the invention may also be implemented in a scanning multi-beam system 116 as shown in FIG. 14. According to scanning embodiments, the system 116 may include a mirror 118 that is rotatable about an axis A under actuation by a motor 120. The plurality of object beams Os transmitted by the MBLDV 15 may then be reflected off of the mirror 118 simultaneously and onto an object 10 under inspection, as indicated by Os'. The modulated object beams Ms may then be collected by the MBLDV 15. The mirror 118 may then be rotated so that the reflected object beams Os' are incident at a different location of the object 10. Accordingly, over time a plurality of points $t_1, t_2, t_3, t_4, \ldots$ are analyzed by each of the object beams Os'.

One of the advantages of the scanning MBLDV 116 is that the mirror 118 only needs to rotated about a single axis A. Although a two-axis rotatable mirror may be utilized, the single-axis mirror 118 is able to scan a surface of the object 10. More specifically, the MBLDV 15 provides a matrix of a plurality of object beams Os, e.g., an X matrix. The entire matrix may then be scanned in one axis, e.g., a Y matrix) to provide an X-Y matrix of data. Accordingly, over a relatively short period of time, an entire surface of the object 10 may be scanned by the matrix of object beams and analyzed.

For the purposes of the following claims, the phenomenon of the transmitted object beams Os being reflected, scattered, and backscattered by the object 10, thereby resulting in the modulated object beams Ms, will be simply indicated by the word reflect and its forms, such as reflected.

Those skilled in the art will understand that the preceding exemplary embodiments of the present invention provide the foundation for numerous alternatives and modifications thereto. For example, although the preceding description set for the principles of the invention in terms of a coherent light source such as a laser, other types of coherent radiation may be utilized, such as microwaves, millimeter waves, and so on. These and other modifications are also within the scope of the present invention. Accordingly, the present invention is not limited to that precisely as shown and described above but by the scope of the appended claims.

What is claimed is:

1. A multi-beam heterodyne vibrometer for analyzing vibration of an object, the vibrometer comprising:
   an optical system for:
      generating a plurality of object beams and a plurality of frequency-shifted reference beams, the plurality of frequency-shifted reference beams having a frequency that is shifted from a frequency of the plurality of object beams;
      transmitting the object beams to the object, a portion of each of the object beams being reflected off of the object as a modulated object beam; and
      collecting the modulated object beams; and
   a combining element for combining each of the modulated object beams with a respective one of the frequency-shifted reference beams into a plurality of beam pairs.

2. The vibrometer of claim 1 wherein the plurality of modulated object beams and the plurality of frequency-shifted reference beams have the same polarization.

3. The vibrometer of claim 1 wherein the plurality of modulated object beams and the plurality of frequency-shifted reference beams are collimated prior to being combined into the beam pairs.

4. The vibrometer of claim 1 wherein the optical system includes a pair of beam splitters for respectively splitting an object beam into the plurality of object beams and a frequency shifted reference beam into the plurality of frequency-shifted reference beams.

5. The vibrometer of claim 4 wherein the optical system further includes:
   a laser for providing an output beam; and
   an output beam splitter for splitting the output beam into the object beam and a reference beam;
   the reference beam being frequency shifted to yield the frequency-shifted reference beam prior to being split into the plurality of frequency-shifted reference beams.

6. The vibrometer of claim 4 wherein the beam splitters split the object beam and the frequency-shifted reference beam such that the plurality of object beams and the plurality of frequency-shifted reference beams diverge from the respective beam splitter at substantially the same angle.

7. The vibrometer of claim 6 wherein the beam splitters split the object beam and the frequency-shifted reference beam such that the number of object beams is equal to the number of frequency-shifted reference beams.

8. The vibrometer of claim 7 wherein the optical system further includes
   a first telescope for directing the object beam onto one of the beam splitters; and
   a second telescope for directing the frequency-shifted reference beam onto the other one of the beam splitters.

9. The vibrometer of claim 8 wherein the object beam and the frequency-shifted reference beam each have a diameter;
   the telescopes for directing the beams onto a respective one of the beam splitters such that the diameters of the beams are substantially equal when incident upon the beam splitters.

10. The vibrometer of claim 1 wherein the optical system includes a collecting lens for collecting the modulated object beams;
    the collecting lens having a focal length and being positioned from a surface of the object by a distance substantially equal to the focal length.

11. The vibrometer of claim 10 wherein the optical system further includes an aperture positioned next to the collecting lens.

12. The vibrometer of claim 11 wherein the frequency-shifted reference beams have a diameter and the aperture has a diameter substantially equal to the diameter of the frequency-shifted reference beams.

13. The vibrometer of claim 10 further comprising a focusing lens positioned downstream from the combining element and having a focal length;
    the focusing lens being positioned from the collecting lens by a distance substantially equal to the focal length of the focusing lens.

14. The vibrometer of claim 13 wherein the focusing lens renders the plurality of beam pairs substantially parallel with each other.

15. The vibrometer of claim 13 further comprising a detector element positioned downstream from the focusing lens by a distance substantially equal to the focal length of the focusing lens.

16. The vibrometer of claim 13 further comprising an output element positioned downstream from the focusing lens by a distance substantially equal to the focal length of the focusing lens.

17. The vibrometer of claim 16 wherein the output element includes a plurality of optical fibers;
    the focusing lens for focusing each of the beam pairs onto a respective one of the optical fibers.

18. The vibrometer of claim 17 further comprising a detector element positioned downstream from the optical fibers for detecting the beam pairs.

19. The vibrometer of claim 18 wherein the output element includes a plurality of photodetectors each detecting a respective one of the beam pairs.

20. The vibrometer of claim 1 wherein the optical system includes:
    a laser for providing an output beam; and
    an output beam splitter for splitting the output beam into an object beam from which the plurality of object beams originates and a reference beam from which the plurality of frequency-shifted reference beams originates.

21. The vibrometer of claim 20 wherein the optical system further includes an acousto-optical modulator (AOM) positioned downstream from the output beam splitter for shifting a frequency of the reference beam.

22. The vibrometer of claim 21 wherein the optical system further includes a pair of AOMs positioned in series downstream from the output beam splitter.

23. The vibrometer of claim 22 wherein one of the AOMs operates at a first frequency and the other one of the AOMs operates at a second frequency;
    the frequency of the reference beam being shifted by a carrier frequency that is a function of the first frequency and the second frequency.

24. The vibrometer of claim 23 wherein the AOMs are positioned in opposite directions;
    the carrier frequency being equal to the difference of the first and second frequencies.

25. The vibrometer of claim 23 further comprising a pair of frequency generators for respectively driving the AOMs at the first frequency and the second frequency.

26. The vibrometer of claim 25 wherein at least one of the frequency generators is adjustable such that the carrier frequency is adjustable.

27. The vibrometer of claim 25 wherein the frequencies from the frequency drivers are mixed to yield a reference signal that is provided to an electronic system for analyzing the modulate object beams.

28. The vibrometer of claim 1 further comprising an output system for analyzing the modulated object beams.

29. The vibrometer of the 28 wherein the output system includes a computer.

30. The vibrometer of claim 1 further comprising an acoustic source for vibrating the object.

31. The vibrometer of claim 1 further comprising a mirror for reflecting the transmitted object beams onto the object.

32. The vibrometer of claim 31 further comprising a motor for rotating the mirror so that the transmitted object beams scan the object.

33. A method for analyzing vibration of an object, the method comprising:
    transmitting a plurality of object beams to the object, a portion of each of the object beams being reflected by the object as a modulated object beam;
    collecting the modulated object beams; and
    combining each of the modulated object beams with a frequency-shifted reference beam.

34. The method of claim 33 further comprising splitting an object beam into the plurality of object beams.

35. The method of claim 34 further comprising splitting a frequency-shifted reference beam into the plurality of frequency-shifted reference beams.

36. The method of claim 35 further comprising shifting a frequency of a reference beam to yield the frequency-shifted reference beam.

37. The method of claim 36 further comprising splitting a coherent light beam into the object beam and the reference beam.

38. The method of claim 35 wherein the object beam and the frequency-shifted reference beam are respectively split into an equal number of object beams and frequency-shifted reference beams.

39. The method of claim 35 wherein the plurality of object beams diverge upon splitting of the object beam at an angle and the plurality of frequency-shifted reference beams diverge at an angle upon splitting of the frequency-shifted reference beam;
    the angle of the object beams being substantially equal to the angle of the frequency-shifted reference beams.

40. The method of claim 35 further comprising directing the object beam and directing the frequency-shifted reference beam such that the object beam and the frequency-shifted reference beam are substantially the same size when split.

41. The method of claim 35 further comprising focusing the plurality of object beams onto the object.

42. The method of claim 33 further comprising polarizing the modulated object beams and the frequency-shifted reference beams so that the modulated object beams and the frequency-shifted reference beams have the same polarization prior to combining.

43. The method of claim 33 wherein the collecting step-including collecting the modulated object beams with a collecting lens, the method further comprising:

focusing the modulated object beams onto the collecting lens.

44. The method of claim 33 wherein the modulated object beams have a diameter and the frequency-shifted reference beams have a diameter, the method further comprising:
matching the diameter of the modulated object beams with the diameter of the frequency-shifted reference beams.

45. The method of claim 33 wherein the plurality of object beams transmitted to the object are reflected off of the object as scattered light, the method further comprising:
separating the scattered light into the plurality of modulated object beams.

46. The method of claim 33 further comprising collimating the modulated object beams and the frequency-shifted reference beams prior to combining.

47. The method of claim 33 further comprising rendering the plurality of beam pairs parallel with each other.

48. The method of claim 33 further comprising focusing the plurality of beam pairs onto a detector element.

49. The method of claim 33 further comprising focusing the plurality of beam pairs onto an output element.

50. The method of claim 49 wherein the output element includes a plurality of optical fibers, the method further comprising:
focusing the plurality of beam pairs such that each of the optical fibers receives one of the beam pairs.

51. The method of claim 33 further comprising transmitting the plurality of beam pairs to a plurality of detectors to yield a plurality of frequency-modulated signals.

52. The method of claim 51 further comprising analyzing the plurality of frequency-modulated signals.

53. The method of claim 52 wherein the analyzing step includes calculating displacement of the object.

54. The method of claim 52 wherein the analyzing step includes calculating velocity of the object.

55. The method of claim 52 further comprising displaying analyzed data associated with the frequency-modulated signals.

56. The method of claim 33 wherein the object is buried in soil, the method further comprising:
causing the object to vibrate, thereby causing the soil to vibrate and modulate the plurality of transmitted object beams to yield the plurality of modulated object beams.

57. The method of claim 33 wherein the causing step includes transmitting acoustic waves toward the object.

58. The method of claim 33 further comprising scanning the transmitted object beams over the object.

59. A multi-beam heterodyne vibrometer for analyzing vibration of an object, the vibrometer comprising:
a laser for providing an output beam;
a first beam splitter for splitting the output beam into an object beam and a reference beam;
a second beam splitter for splitting the object beam into a plurality of object beams for transmission to the object, a portion of each of the object beams being reflected by the object as a modulated object beam;
a collecting lens for collecting the plurality of modulated object beams;
a frequency shifter for shifting a frequency of the reference beam to yield a frequency-shifted reference beam;
a third beam splitter for splitting the frequency-shifted reference beam into a plurality of frequency-shifted reference beams;
a combining element for combining each of the modulated object beams with a respective one of the frequency-shifted reference beams into a plurality of beam pairs.

60. The vibrometer of claim 59 further comprising an output element for receiving the plurality of beam pairs.

61. The vibrometer of claim 60 wherein the output element is an array including a plurality of elements.

62. The vibrometer of claim 61 further comprising a focusing lens for focusing each of the beam pairs onto a respective one of the elements of the array.

63. The vibrometer of claim 62 wherein the array includes a plurality of photodetectors.

64. The vibrometer of claim 62 wherein the array includes a plurality of optical fibers.

65. The vibrometer of claim 59 wherein the output element provides a plurality of frequency-modulated signals based on the plurality of beam pairs.

66. The vibrometer of claim 65 further comprising a computer for processing data associated with the frequency-modulated signals.

67. The vibrometer of claim 66 further comprising software for utilization by the computer.

68. The vibrometer of claim 59 further comprising a plurality of waveplates for polarizing the plurality of modulated object beams and the plurality of frequency-shifted reference beams such that the plurality of modulated object beams and the plurality of frequency-shifted reference beams have the same polarization when combined.

69. A multi-beam heterodyne vibrometer for analyzing vibration of an object, the vibrometer comprising:
an optical system for:
generating coherent light;
splitting the coherent light into an object beam and a reference beam;
shifting the frequency of one of the beams;
splitting the object beam into a plurality of object beams
splitting the reference beam into a plurality of reference beams;
transmitting the object beams to the object, a portion of each of the object beams being reflected off of the object as a modulated object beam; and
collecting the modulated object beams; and
a combining element for combining each of the modulated object beams with a respective one of the reference beams into a plurality of beam pairs.

70. The vibrometer of claim 69 wherein the optical system shifts the frequency of the reference beam.

* * * * *